United States Patent Office 3,326,715
Patented June 20, 1967

3,326,715
METHOD FOR PRODUCING NON-GLARE, LOW SPECULAR REFLECTING FILMS ON GLASS ARTICLES
Robert G. Twells, New Kensington, Pa., assignor to Pittsburgh Plate Glass Company, Pittsburgh, Pa., a corporation of Pennsylvania
No Drawing. Filed Mar. 20, 1963, Ser. No. 266,511
6 Claims. (Cl. 117—124)

This invention is directed to a method for the preparation of non-glare, tenaciously adherent, low specular reflecting durable films on glass surfaces. More particularly, this invention relates to a method of preparing a non-glare glass by contacting the glass surface or surfaces to be treated with an aqueous system containing potassium silicate having a weight ratio of $SiO_2$ to $K_2O$ of at least 2.3 to 1, and a mole ratio of $SiO_2$ to $K_2O$ of at least 3.6 to 1 at ambient room temperatures, and thereafter heating said glass at temperature of at least 940° F. for a sufficient period of time to thermally develop the potassium silicate film.

According to one of the preferred embodiments of this invention, glass articles are produced which have a colored non-glare, low specular reflecting potassium silicate film thereon.

In the present-day commercial production of window, plate, and colored glass, the glass surfaces produced generally have high specular reflection characteristics yielding high glare surfaces. These high specular reflection characteristics are often objectionable when the glass is to be used for a cover for a frame picture, as a cover on a desk, or as a face plate (implosion panel) on a television picture tube, due to the fact that the attention of an observer is distracted by images reflected by the smooth surface. Not only is this distraction present due to the comparatively true resolution of the reflected images, but also if the reflected image constitutes a strong light source there is present a glare which makes it difficult, if not impossible for a television viewer to observe the transmitted image on the television tube due to the high glare of the reflected image of the light source on the outer surface of the implosion panel. Heretofore, it has been necessary to use a chemical etching method generally employing hydrofluoric acid solutions to roughen the surface of the glass by dissolving away the outermost layers of glass. Such etching treatments usually involve a plurality of immersion steps which often require close control over the etching solution, the atmospheric environment in which the etch takes place, and the after treatment of the etched atricles. This close control in the complex chemically etching methods presently available makes the chemically etching method of reducing the glare on the surfaces of the glass a very expensive and time consuming operation.

The present invention provides an easy, rapid, relatively inexpensive method for securing a non-glare surface on glass, and the glass thereby produced is as good as or even better than chemically etched glass in its characteristics of low specular reflectance.

It is important in the production of glass articles in accordance with the method of this invention that the resolution characteristics of the glass when an image is viewed through the treated glass should not be impaired, e.g. the scattering of light rays should not interfere with the ability of the glass to resolve the details of the image when the spectator views through the treated glass article, e.g. when viewing a television picture through an implosion panel.

Moreover, the treated glass articles should have adequate moisture resistance and durability to common household detergents, soaps and other cleansing agents and like materials which may be employed to clean the articles from time to time. Hence, it will be understood that non-glare films on glass articles which are intended to serve as implosion panels for a television picture tube, and similar uses, should have a combination of properties including: freedom from glare; tenacious adhesion to the glass base; low surface reflection, low surface reflection resolution, i.e., low resolution of reflected images from the surface of the glass; freedom from impairment of resolution when viewing through the treated article; adequate moisture resistance and stain resistance when washed with water or detergent solutions; good color resolution when viewing through the treated article e.g. in the case of implosion panels for colored television picture tubes, or picture glass; etc.

These and other desired properties are secured in accordance with the practice of this invention by contacting the glass surface or surfaces to be treated with an aqueous system containing a potassium silicate having a weight ratio of $SiO_2$ to $K_2O$ of at least 2.3 to 1, a mole ratio of $SiO_2$ to $K_2O$ of at least 3.6 to 1, and an $SiO_2$ content of said aqueous system (based on water) of at least 3 percent by weight, and thereafter heat treating the coated article at elevated temperatures. The contact of the glass surface to be treated with the aqueous potassium silicate system as defined hereinabove can be effected conveniently with both the glass and the aqueous potassium silicate treating composition being at ambient room temperatures (from 60° to 75° F.).

The aqueous potassium silicate is preferably contacted with the glass surface by spraying from a spray gun although other contacting or coating systems can be used. After the aqueous potassium silicate has been deposited on to the glass surface, the glass article containing the coating of potassium silicate thereon is subjected to a heat treatment at an elevated temperature for a sufficient period of time to thermally develop a tenaciously adherent water-insoluble, low specular reflecting film on the glass. In order to insure the development of such films in a reasonably rapid period of time and to insure the obtainment of the desired properties, a temperature of at least 940° F. usually is required for treatment of most soda-lime-silica base glass compositions. The maximum temperature employed of course, will be governed by the melting point of the particular base glass being treated. That is to say that the maximum temperature for the heat treatment should not exceed that temperature which the glass becomes molten and behaves like a liquid rather than a solid material. With precaution in mind, the upper limit of the temperature range is determined by the type of glass article to be produced.

For example, if a flat picture glass is sought to be produced, temperatures of the order of 950° to 1050° F. are usually sufficient for heat treating and at these temperatures the heat treatment will generally be conducted for a period of time ranging from about several minutes or less up to one hour or perhaps longer. However, if a curved television implosion plate is to be produced, the heat treatment can be conducted in conjunction with the bending operation, thereby employing the same thermal energy required for bending (to thermally deform the glass to a sufficient extent to allow bending to any desired curvature) to effect the desired thermal development of the potassium silicate film. Hence the film can be thermally developed to have the desired properties and bent at the same time during the same operation. Thus, it will be noted that this invention is especially advantageous when employed to produce curved implosion panels on TV tubes, especially when compared to conventional prior art chemical etching methods. When the thermal development of the coating is conducted in conjunction with bending, the period of time required to both develop the non-glare potassium silicate films and bend the flat articles to the desired configuration can be reduced to as short as three to five minutes and even less.

Generally when these potassium silicate films are thermally developed in conjunction with bending, the temperatures employed are those conventionally employed to effect bending of the base glass compositions being bent. Usually when the base glass is a soda-lime-silica glass composition, the combined bending and heat treatment of the coating of the potassium silicate coating can be satisfactorily conducted at temperatures ranging from about 1100 to 1400° F. for a period of time ranging from two minutes to ten minutes or more with the higher temperatures allowing the use of shorter time periods and vice versa. This is specially true when press bending techniques are employed to effect bending.

Various suitable convenient coating or contacting systems can be employed to coat the aqueous potassium silicate on to the glass surface being treated. However, optimum results can be secured by use of a spray coating system. When using spray coating system, droplets issuing from the spray gun orifices should be uniform and finely divided, such as the droplets issuing from spray orifices having diameters ranging from 0.030 to 0.090 inch for gaseous spraying pressures ranging from about 10 to 200 pounds per square inch or greater. Usually the orifice diameter from which the droplets are sprayed ranges from 0.035 to 0.080 inch, and spraying pressures of from 20 to 70 pounds per square inch are employed using air or other suitable inert gaseous medium to propel the aqueous potassium silicate droplets onto the glass surface.

To achieve the optimum benefits obtainable by this invention control of the viscosity of the aqueous potassium silicate solution is desired. Usually the viscosity of the coating solution or dispersion should be from about 2 to 40 centipoises per second at 68° F. More preferably the viscosity ranges from about 3 to 20 centipoises per second at 68° F., and very good results are attainable with viscosities of from about 3 to 10 centipoises per second at 68° F.

The aqueous potassium silicate treating systems can be prepared readily merely by mixing previously dissolved or dispersed potassium silicate having the above defined weight and mole ratios of $SiO_2$ to $K_2O$ with the requisite amount of water followed by stirring and filtering through a suitable screen, e.g. a 200 mesh screen. Demineralized water is preferably employed to form the solution or dispersion. The term "aqueous system" as employed herein is intended to include both aqueous dispersions and aqueous solutions since for the purpose of the present invention there is no substantial difference between the two insofar as the results attained.

Then the potassium silicate aqueous system is sprayed onto the glass surface to be treated and the coating is thereafter developed by heat treating in the manner specified hereinabove. After thermal development of the potassium silicate film, the treated glass surface can be mildly abraded (buffed) with a pumice and water slurry under a rotating felt pad to smooth the surface of the film if the potassium silicate filmed surface is not smooth enough for the particular utility for which the glass article is intended.

A further embodiment of this invention wherein no film rub down or abrasion is needed to secure uniformly smooth potassium silicate films, involves the use of an aqueous potassium silicate coating system including minor amounts of a water compatible organic polymeric bodying agent capable of being readily dissolved or dispersed in water. For example, good results have been secured leading to smooth, uniform thermally developed potassium silicate non-glare films on various types of base glass compositions by including about 3 to 12 percent by weight of a 46 percent solids aqueous emulsion of an acrylic polymer, the aqueous emulsion having a solids content ranging from about 45 to 50 percent by weight and a pH ranging from about 8 to about 10. When this or an equivalent bodying agent is included in the aqueous potassium silicate coating system, the water compatible bodying agent is usually mixed with the aqueous potassium silicate by stirring, and then filtered through a 200 mesh screen followed by spraying as described hereinabove with respect to the aqueous potassium silicate coating system containing no bodying agent.

A further embodiment of this invention involves the formation of colored potassium silicate non-glare films having reduced transmission characteristics in addition to low specular reflection by spraying and heat treating an aqueous potassium silicate solution or dispersion containing both an organic polymeric embodying agent and a coloring agent, e.g. an inorganic coloring agent such as an inorganic coloring oxide or mixture of inorganic coloring oxides, such as the oxides of cobalt, chromium, manganese, nickel and iron employed singly or as mixtures of any two or more of these metal oxides. In such cases the aqueous system has essentially three components: water, the potassium silicate having the above specified weight and mole ratios of $SiO_2$ to $K_2O$ and the coloring oxides with the organic bodying agent being optionally used to eliminate post treatment smoothing.

The aqueous system containing the three above essential components can be prepared readily by mixing the water and potassium silicate (the organic polymeric bodying agent also being added if one is employed), stirring the above materials to obtain uniform distribution thereof, adding the coloring oxide or mixture of oxides, ball milling the composition for a period ranging from about 30 minutes to 20 hours, and then screening the resulting ball milled composition through a 200 mesh screen to control uniformity of the solution for spraying purposes. The thus screened aqueous potassium silicate composition is then sprayed onto the glass surface to be treated to room temperature followed by thermal development at the temperatures set forth hereinabove.

The present invention is applicable to producing tenaciously adherent, non-glare, water-insoluble, low specular reflecting potassium silicate films including colored films of reduced transmissivity on the surface of a wide variety of glass base compositions. Hence, this invention is applicable to providing non-glare surfaces on soda-lime-silica glasses; alkali-alumina-silica glass compositions such as those containing lithia as a component alkali; alkali-zirconia-silica glasses and alkali-alumina-zirconia-silica glasses. The present invention is especially well adapted to providing non-gare, low specular reflecting films on the surfaces of soda-lime-silica glass base. The base soda-lime-silica glass to be treated can be a clear glass or it can be a colored glass tinted by the introduction of various metal oxides or metal oxide mixtures. Representative soda-lime-silica glass bases which can be treated in accordance with this invention usually contain 65 to 75 percent by weight $SiO_2$, 10 to 18 percent $Na_2O$, 5 to 15 percent by weight CaO, 2 to 5 percent by weight MgO, 0.1 to 1.0 percent by weight $Na_2SO_4$, 0 to 5 percent by weight aluminum oxide ($Al_2O_3$), 0 to 1 percent by weight $K_2O$, 0 to 1 percent by weight iron oxide ($Fe_2O_3$) and 0 to 0.5 percent by weight of NaCl, $As_2O_5$, BaO, NiO and and CoO.

A representative range of composition for soda-lime glasses is listed as follows (wherein the given amounts of metals listed are determined as their oxides, except as otherwise noted):

| Component: | Percent by weight |
|---|---|
| $SiO_2$ | 68 to 73.5 |
| $Na_2O$ | 12 to 17 |
| CaO | 7 to 12 |
| MgO | 2 to 4 |
| $Na_2SO_4$ | 0.3 to 0.8 |

| | Percent by weight |
|---|---|
| NaCl | 0.05 to 0.3 |
| $Fe_2O_3$ | 0.05 to 0.3 |
| $Al_2O_3$ | 0.05 to 3.5 |
| $K_2O$ | 0 to 1.0 |
| $As_2O_5$ | 0 to 0.5 |
| BaO | 0 to 0.1 |
| NiO | 0 to 0.1 |
| CoO | 0 to 0.1 |

The glass articles which are to be treated in accordance with the practice of this invention should be clean and free of surface dirt or stains prior to treatment. Dirt and surface scum can be removed from the glass by the use of commercial glass cleansing procedures involving use of glass cleaning products and/or conventional glass washing machines followed by wiping with a clean cloth. Severe surface abrasions and/or scratches can be removed by buffing, if necessary, using an aqueous slurry of cerium oxide or other suitable buffing material. Superificial scratches need not be removed since the potassium silicate film developed in accordance with the practice of this invention tends to mask such minor surface defects.

The following examples illustrates the best modes contemplated for carrying out this invention:

*Example I.—"Composition A"*

| Component: | Percent by weight |
|---|---|
| $SiO_2$ | 73.0 |
| $Na_2O$ | 13.2 |
| CaO | 8.5 |
| MgO | 3.5 |
| $Al_2O_3$ | 1.2 |
| $Na_2SO_4$ | 0.4 |
| NaCl | 0.1 |
| $Fe_2O_3$ | 0.1 |

12 inch by 12 inch by ⅛ inch clean polished glass sheets of "Composition A" listed above were spray coated at room temperature with an aqueous potassium silicate solution containing 14.5 percent by weight of a potassium silicate having a weight ratio of $SiO_2$ to $K_2O$ of 2.5 to 1 and a mole ratio of $SiO_2$ to $K_2O$ of 3.92 to 1, with the remainder (85.5 percent by weight) being demineralized water.

The above potassium silicate spraying solution was prepared by mixing equal weight amounts of demineralized water and "Kasil #1," liquid (an aqueous potassium silicate liquid containing potassium silicate having a weight ratio of $SiO_2$ to $K_2O$ of 2.5 to 1, a mole ratio of $SiO_2$ to $K_2O$ of 3.92 to 1. "Kasil #1" liquid contains 8.3 percent by weight of $K_2O$ and 20.8 percent by weight of $SiO_2$ with the remainder being water. "Kasil #1" aqueous potassium silicate liquid has a Baume specific gravity of 29.8° at 68° F. (equivalent to a specific gravity of 1.26 at 68° F. under the centimeter-gram-second system), and a viscosity 0.4 poises (38 centipoises) at 68° F. "Kasil #1" is a product of Philadelphia Quartz Company.

This aqueous potassium silicate spraying solution had a viscosity of 5.5 centipoises per second at 68° F., and was applied onto the top surface of the above noted glass sheets by spraying from hand spray guns having an orifice diameter of 0.070 inch and using an air pressure of 25 to 30 pounds per square inch. An even coating was secured using an average of twenty four passes per sheet. The glass sheets were sprayed in horizontal position, and the spray hit the sheet in the form of a fine mist with small droplets.

Following spraying the potassium silicate coating was thermally developed by heating in an oven at 1,000° F. for 15 minutes. Following heat treatment the treated surface was buffed with an aqueous pumice slurry rinsed with water and air dried at room temperature.

Then the thus treated glass sheets were subjected to various tests to determine the effect of the above treatment on glare reduction, durability and adhesion of the heat developed film and other properties noted above.

Reflectance measurements on the glass sheets before and after coating revealed a vast difference in glare and surface reflection characteristics. The uncoated sheets had a surface reflectance of approximately 94 percent compared to an average of approximately 34 percent reflectance for the filmed sheets. Moreover, the reflected image resolution from the surfaces of the untreated sheets was very high as compared to extremely low specular reflection from the treated surfaces. While the art has not as yet developed a recognized acceptable objective standard for evaluating the resolution of images which are reflected from glass surfaces; it is interesting to note that when the treated glass articles were used as "picture glass" to cover framed pictures, the impression is created that no glass is present and that the observer is viewing the picture surface directly. In this regard the picture resolution (through the treated glass) was excellent even for colored pictures having a variety of bright pastel colors.

One year outdoor exposure testing conducted on the treated sheets both in Florida and Pennsylvania revealed no significant detrimental effects on the potassium silicate films.

No observable significant detrimental effects to the filmed surface of the treated sheets were noted in a one year "Cycling Cold Box" humidity exposure test, which involved exposing the treated sheets to temperatures ranging from 20° F. to 140° F. over 8 hour cycles (4 hours at 20° F. and 4 hours at 140° F. in a temperature controlled sealed cabinet) repeated 3 times daily for one year.

One thousand hours of exposure in an Atlas Twin Arc Weatherometer failed to produce any significant observable deleterious effect on the potassium silicate films of the treated sheets.

Two weeks exposure of the treated sheets in a salt spray cabinet using a 4 percent aqueous sodium chloride solution failed to damage the potassium silicate film.

Six weeks immersion of the treated sheets in distilled water at room temperature with half of the sheet immersed and the remainder not immersed but subjected to water vapor failed to noticeably damage the potassium silicate films.

One thousand hours exposure in an Atlas Fadeometer failed to produce any significant effect on the films of the treated sheets.

Twenty-five two minute cycles in a washing test which employed a 1 percent by weight "Cheer" solution had no observable deleterious effects on the films.

Thirty minutes spot formation testing of the treated sheets at room temperature using 10 percent aqueous solutions of HCl, $H_2SO_4$ and $HNO_3$, respectively revealed no observable adverse effects on the potassium silicate filmed surfaces.

The filmed surface of the treated sheets passed the Porcelain Enamel Institute "Spot Test" for weatherability (10 percent by weight aqueous citric acid solution at room temperature for 15 minutes).

The films were tenaciously adherent to the glass surface and could not be removed with "Scotch Tape." In fact even partial film removal was quite difficult even by scraping with a sharp object. The results of the various adhesion tests conducted on the potassium silicate films support a conclusion that the thermally developed films are chemically combined with the glass surface.

It will be realized that the above tests are quite severe tests in relation to such indoor applications of the present invention as television implosion panels and picture glass. However, these tests serve to illustrate the durability of the films for outdoor use especially in areas of use requiring moisture and humidity resistance, e.g. as architectural spandrels and similar glass closures.

The combination of a wide spectrum of advantageous properties attainable in the practice of this invention is truly surprising.

The advantages secured according to this invention are not attainable when using aqueous potassium silicates having $SiO_2$ to $K_2O$ weight ratios well below the specified ratio of 2.3 to 1. The same is true concerning the above specified thermal development temperatures. The use of heat treating temperatures significantly below those specified yields resulting properties inferior to those attainable with this invention.

The above treatment was repeated on glass sheets ("Composition A") having a wide variety of sizes ranging from small test squares approximately 1 inch on a side to large rectangular sheets 90 inches long by 50 inches wide and with thicknesses ranging from 3/32 inch to 3/16 inch.

*Example II.—"Composition B"*

| Component: | Percent by weight |
|---|---|
| $SiO_2$ | 71.6 |
| $Na_2O$ | 13.1 |
| CaO | 11.7 |
| MgO | 2.5 |
| $Na_2SO_4$ | 0.7 |
| NaCl | 0.1 |
| $Fe_2O_3$ | 0.1 |
| $Al_2O_3$ | 0.2 |

Glass plates 12 inches by 12 inches by 0.250 of "Composition B" listed above were sprayed with aqueous potassium silicate and heat treated as in Example I. These treated plates possess essentially the same properties as the treated sheets of Example I.

*Example III.—"Composition C"*

| Component: | Percent by weight |
|---|---|
| $SiO_2$ | 68.9 |
| $Na_2O$ | 16.1 |
| CaO | 7.7 |
| MgO | 2.7 |
| $Na_2SO_4$ | 0.6 |
| NaCl | 0.2 |
| $Fe_2O_3$ | 0.1 |
| $Al_2O_3$ | 3.0 |
| $K_2O$ | 0.5 |
| $As_2O_5$ | 0.1 |
| BaO | 0.05 |
| NiO | 0.025 |
| CoO | 0.0039 |

Glass "Composition C" in a thickness of 0.125 inch has a light transmission of 69 percent prior to treatment. In a thickness of 3/16 inch, "Composition C" has a transmissivity of 61 percent. When compared to "Composition A" which has a transmissivity of 90 percent in a thickness of 0.125 inch and "Composition B" having a transmissivity of 89 percent for a 0.250 inch thickness, "Composition C" is considered a low transmission glass.

Light gray colored glass sheets 12 inches by 12 inches by 0.125 inch of "Composition C" listed above were sprayed with aqueous potassium silicate and heat treated according to Example I. These treated sheets possess essentially the same properties as the treated sheets of Example I. Circular "Composition C" plates 21 inches in diameter and having thicknesses of 2/16 inch and 3/16 inch were also sprayed and heat treated in accordance with Example I. These plates were bent into television implosion plates having excellent non-glare and low specular reflectance properties. The bending temperatures had no adverse effects on the previously thermally developed films.

*Example IV*

Clear glass plates 12 inches by 12 inches by 0.250 inch of "Composition B" set forth above in Example II were sprayed at room temperature as in Example I only using an aqueous solution or dispersion of "Kasil #1" containing an organic polymeric bodying agent ("Rhoe-Plex AC–33" an emulsion of an arcylic polymer having 46 percent by weight solids and having a pH between 9 and 9.5).

This aqueous spraying solution was prepared by mixing 10 grams of "Rhoe-Plex AC–33," 20 cc. of Kasil #1 liquid potassium silicate solution and 100 cc. demineralized water. After thorough mixing the spray solution was filtered through a 200 mesh screen and sprayed from hand spray guns onto the glass plates at room temperature using approximately twenty four passes to coat each plate. This aqueous potassium silicate spraying solution had a viscosity of 5.0 centipoises per second at 68° F.

Then these coated plates were oven heated at 1000° F. for 15 minutes to thermally develop the coating.

As compared to the films of Examples I to III, the films produced using the organic acrylic polymer bodying agent were smoother. Hence, it was noted that when this bodying agent is employed, the necessity of a post treatment rub down with pumice was avoided.

Subsequent comparative tests using aqueous potassium silicate spraying solutions with and without the organic polymeric bodying agent establish that faster application spraying can be accomplished when the bodying agent is employed than when no bodying agent is used.

*Example V*

Light gray colored glass plates 12 inches by 12 inches by 3/16 inch of "Composition C" were treated in accordance with Example IV to produce non-glare, low specular reflectance potassium silicate filmed articles.

*Example VI*

Clear glass sheets 12 inches by 12 inches by 0.125 inch of "Composition A" were sprayed with an aqueous solution of potassium silicate "Kasil #1" containing an organic bodying agent ("Rhoe-Plex AC–33") and a mixture of inorganic coloring oxides to impart a light gray color to the treated glass surfaces upon heat treating.

This spray solution was prepared by mixing 20 grams of "Rhoe-Plex AC–33," 40 cc. of "Kasil #1" solution and 200 cc. demineralized water. This mixture was stirred to obtain homogeneous distribution of the components. Then 2 grams of Du Pont "K 929" black oxide was added and the resulting composition was ball milled for periods of from 1 to 16 hours followed by screening through a 200 mesh screen. "K 929" black oxide is a mixture of the calcined oxides of iron, chromium, and cobalt with essentially one-third of each (33 percent) constituting the mixture on a weight basis. Ninety-seven percent of all oxide particles of "K 929" oxide mixture have a size (diameter) of less than 5 microns.

This spray solution was deposited onto the glass sheets in the same manner as in Example I and thermally developed at an oven temperature of 1260° F. for 3 to 5 minutes.

The light gray color of the resulting colored, heat cured potassium silicate films closely matched the chromaticity (color) and low transmissivity characteristics of the light gray colored "Composition C" sheets of 3/16 inch thickness both untreated and having a colorless potassium silicate heat treated film deposited and developed in accordance with Example IV. The potassium silicate filmed articles had very good non-glare and low specular reflectance properties. Consequently it was concluded that the light gray color inherent to "Composition C" in a thickness of 3/16 inch could be closely approximated by providing a clear 2/16 inch thick glass sheet of "Composition A" with a light gray colored non-glare film of heat treated potassium silicate having included therein a small amount of a coloring oxide mixture. This affords savings in glass costs since "Composition C" is more expensive than either "Composition A" or "Composition B." Furthermore, savings are also secured in being able to meet the color resolution characteristics desired for the television industry (in addition to obtaining the requisite non-glare, low specular reflection required for television implosion panels whether used with black and white or color transmitting television tubes). Moreover, the savings attainable in accordance with this embodiment are substantial when the inherent color characteristics of the more expensive colored glass base "Composition C" in a greater thickness can be matched very closely using a less expensive clear glass base composition in reduced thickness by providing the thinner, less expensive glass base with a colored, non-glare, low specular reflecting heat treated potassium silicate film of reduced transmissivity and containing inorganic coloring oxides in small amounts.

The color filmed glass articles produced according to this invention are useful as implosion panels for television tubes transmitting both colored and black and white pictures.

*Example VII*

Light gray colored glass plates 12 inches by 12 inches by 0.125 inch of "Composition C" were provided with a matching light gray colored non-glare, low specular reflection film of heat treated colored potassium silicate in accordance with the procedure of Example VI above. These articles possess chromaticity characteristics very closely matching those of 3/16 inch untreated plates of "Composition C."

*Example VIII*

Clear glass plates 12 inches by 12 inches by 0.250 inch of "Composition B" were provided with a light gray colored, non-glare, low specular reflection film of heat treated potassium silicate in accordance with the procedure of Example VI above.

*Example IX*

Light gray colored circular glass plates 21 inches in diameter and 0.125 inch thick of "Composition C" were sprayed with the aqueous potassium silicate-inorganic coloring oxide ("K-929") containing spray solution of Example VI with a hand spray gun using the spraying procedure outlined in Example I.

Then the thus coated circular plates were heat treated and bent in a combined operation utilizing the heat required to thermally condition the glass for bending to thermally develop the potassium silicate film.

The coated plates were placed in an oven to raise the glass temperature to approximately 1230° F. in a period of 2 minutes and 40 seconds. Then these circular plates were press bent to the desired curvature (28 inch radius of curvature) by inserting in a press bending mold having molding surfaces of appropriate configuration. The mold sections were heated to 400° F. prior to press bending the circular plates and the molding time was 10 seconds per plate.

These molded, bent circular plates have a tenaciously adherent, non-glare, low specular reflection, durable film of heat treated potassium silicate on the surface to which the spray treatment was applied. These plates serve as implosion panels for curved television tubes when attached thereto using any of the conventional procedures for attaching implosion shields to television picture tubes, e.g. laminating the outer surface of a television picture tube to the inner surface of the implosion plate. Usually the treated surface having the non-glare potassium silicate film is located at the outer surface of the implosion panel. However, both the inner and outer surfaces of implosion panels can be treated in accordance with this invention.

By thermally developing the potassium silicate film in conjunction with bending the glass, savings in thermal energy and time can be effected while still insuring proper heat treatment in order to thermally develop the non-glare potassium silicate films attainable in accordance with this invention. Moreover, by maintaining the press bending mold surfaces which contact the glass at a lower temperature than the glass itself a favorable amount of surface hardening (thermal tempering) and its accompanying increase in surface strength can be obtained.

Moreover, the necessary thermal development of the potassium silicate films can be obtained in conjunction with a thermal tempering operation, per se, viz, where no bending is performed, to produce thermally tempered flat glass articles having non-glare, low specular reflecting surfaces and increased surface strength. Such articles can be used as light diffusing glass shower curtains, glass doors and closures, etc.

*Example X*

Light gray colored circular glass plates of "Composition C" 21 inches in diameter and 3/16 inch thick were sprayed and bent in accordance with the Example IX procedure except that the heating time prior to inserting the plates into the press bending mold was 3 minutes at 1240° F. rather than 2 minutes and 40 seconds at 1230° F. as in Example IX. Also, these slightly thicker plates were bent in 12 seconds rather than 10 seconds as in Example IX.

*Example XI*

Light gray colored glass sheets 21 inches by 12 inches by 0.125 inch of "Composition C" and clear glass plates 12 inches by 12 inches by 0.250 inch of "Composition B" were sprayed with the potassium silicate aqueous spraying system of Example I (50 percent by weight "Kasil #1" liquid and 50 percent by weight water) at room temperature using Binks automatic spray equipment to deposit a fine almost dry coating of potassium silicate.

The automatic spraying was conducted using Binks No. 21 spray guns having a No. 65 fluid tip (orifice diameter of 0.059 inch), and a No. 265 needle and using a No. 63 air cap at 55 pounds per square inch gauge air pressure. The glass was moved beneath the overhead spray guns at a conveyor speed of 3 feet per minute while the reciprocator arm on which the spray guns were mounted traversed the glass at a rate of 55 passes per minute. Comparable potassium silicate coatings were deposited using a single spray gun and three cycles through the spraying operation and three spray guns for a single cycle.

After spraying the potassium silicate coatings were fired at various oven temperatures of from 1000° F. up to 1260° F. for heat treating periods of from 3 minutes to 15 minutes with the higher temperature runs being conducted over the shorter time periods. The heat treated potassium silicate films were then buffed with pumice to give smooth, mar-free films. The potassium silicate films thus formed possessed very good non-glare and low specular reflectance properties.

While the above examples illustrate the invention in great detail, it should be realized that the present invention in its broadest aspects is not necessarily limited to the specific compositions, temperatures, procedures and times set forth in the examples.

The surfaces of the glass articles obtained by the practice of this invention possess very low degrees of specular reflectance. For example, pictures framed with this glass do not reflect images as mirror images. The reflected image is "broken up" so that the picture shows through much clearer when viewed from various angles than does a picture covered with ordinary untreated framing glass. Moreover, when this glass is used as a face plate for television tube, interfering reflections of lights, furniture, etc. on the television screen are avoided. Internal defects in the glass article, such as ream, are masked by the practice of this invention.

The present invention can be used to produce not only clear and tinted picture glass and implosion panels for television picture tubes; but also for a wide variety of uses including, but not limited to, the following: architectural spandrels; automobile roof tops; insulating glass units wherein two glass sheets are sealed with the air layer therebetween serving as an insulation medium; glass fiber draperies to reduce their shiny appearance, etc.

What is claimed is:

1. A method of treating glass which comprises contacting glass at a temperature of below about 130° F. with an aqueous system having a viscosity of about 3 centipoise to about 20 centipoise at 68° F. and containing potassium silicate having a weight ratio of $SiO_2$ to $K_2O$ of at least 2.3 to 1 and a mole ratio of $SiO_2$ to $K_2O$ of at least 3.6 to 1, wherein the $SiO_2$ content of said aqueous system based on water is at least 3 percent by weight and thereafter heating said glass at a temperature of at least 940° F. for a sufficient period of time to thermally develop a tenaciously adherent, water-insoluble, non-glare, low specular reflecting potassium silicate film on said glass.

2. A method according to claim 1 wherein said aqueous system includes the least effective amount of an inorganic coloring agent to impart color to said potassium silicate film.

3. A method according to claim 1 wherein said glass is a soda-lime glass.

4. A method of treating glass which comprises contacting glass at a temperature of below about 130° F. with an aqueous system having a viscosity of about 3 centipoise to about 20 centipoise at 68° F. and containing potassium silicate having a weight ratio of $SiO_2$ to $K_2O$ of at least 2.3 to 1 and a mole ratio of $SiO_2$ to $K_2O$ of at least 3.6 to 1, wherein the $SiO_2$ content of said aqueous system based on water is at least 3 percent by weight and thereafter bending the thus treated glass at a temperature of at least 940° F.

5. A method according to claim 4 wherein said aqueous potassium silicate system includes a small amount of a coloring agent to impart color.

6. A method of treating glass which comprises contacting glass at a temperature of below about 130° F. with an aqueous system having a viscosity of about 3 centipoise to about 10 centipoise at 68° F. and containing potassium silicate having a weight ratio of $SiO_2$ to $K_2O$ of at least 2.3 to 1 and a mole ratio of $SiO_2$ to $K_2O$ of at least 3.6 to 1 wherein the $SiO_2$ content of said aqueous system based on water is at least 3 percent by weight and wherein said viscosity is maintained by inclusion of about 3 to 12 percent by weight of an aqueous emulsion of an acrylic polymer having a solids content of from about 45 to about 50 percent by weight and a pH ranging from about 8 to about 10, and thereafter heating said glass at a temperature ranging from about 1000° F. to about 1400° F. for a sufficient period of time to thermally develop a tenaciously adherent water-insoluble, non-glare, low specular reflecting potassium silicate film on said glass.

References Cited

UNITED STATES PATENTS

| | | | |
|---|---|---|---|
| 2,376,163 | 5/1945 | Merzger | 106—84 X |
| 2,428,357 | 10/1947 | Cohen et al. | 117—124 |
| 2,689,804 | 9/1954 | Sadowsky | 117—124 X |
| 2,725,320 | 11/1955 | Atkeson et al. | 117—124 X |
| 2,758,038 | 8/1956 | Lentz et al. | 106—84 X |
| 2,951,773 | 9/1960 | Helle et al. | 117—124 X |
| 3,114,668 | 12/1963 | Guiles | 161—116 |

ALFRED L. LEAVITT, *Primary Examiner.*

W. L. SOFFIAN, H. COHEN, *Assistant Examiners.*